(12) United States Patent
Yamada et al.

(10) Patent No.: US 10,605,304 B2
(45) Date of Patent: Mar. 31, 2020

(54) INSULATED BEARING

(71) Applicants: NSK LTD., Tokyo (JP); TOCALO CO., LTD, Kobe-shi, Hyogo (JP)

(72) Inventors: Manabu Yamada, Fujisawa (JP); Naozumi Nakata, Fujisawa (JP); Shinichi Nishiguchi, Fujisawa (JP); Junichi Takeuchi, Funabashi (JP); Seiki Matsuura, Funabashi (JP); Yuji Okada, Funabashi (JP)

(73) Assignees: NSK LTD., Tokyo (JP); TOCALO CO., LTD, Hyogo (JP)

( * ) Notice: Subject to any disclaimer, the term of this patent is extended or adjusted under 35 U.S.C. 154(b) by 0 days.

(21) Appl. No.: 16/091,857

(22) PCT Filed: Apr. 12, 2017

(86) PCT No.: PCT/JP2017/015034
§ 371 (c)(1),
(2) Date: Oct. 5, 2018

(87) PCT Pub. No.: WO2017/179634
PCT Pub. Date: Oct. 19, 2017

(65) Prior Publication Data
US 2019/0120288 A1    Apr. 25, 2019

(30) Foreign Application Priority Data
Apr. 12, 2016 (JP) ................. 2016-079592

(51) Int. Cl.
*F16C 19/52* (2006.01)
*F16C 19/06* (2006.01)
(Continued)

(52) U.S. Cl.
CPC .............. *F16C 19/52* (2013.01); *F16C 19/06* (2013.01); *F16C 33/586* (2013.01); *F16C 33/62* (2013.01);
(Continued)

(58) Field of Classification Search
CPC ........ F16C 19/06; F16C 19/52; F16C 33/586; F16C 33/62; F16C 33/64; F16C 2380/26;
(Continued)

(56) References Cited

U.S. PATENT DOCUMENTS 5,059,041 A * 10/1991 Watanabe ............... F16C 19/52
 384/476
7,097,362 B2 * 8/2006 Inukai ....................... C23C 4/02
 384/476

(Continued)

FOREIGN PATENT DOCUMENTS

| CN | 1490533 A | 4/2004 |
| CN | 1536238 A | 10/2004 |

(Continued)

OTHER PUBLICATIONS

Machine Translation of J P-2008223996-A (Year: 2008).*
(Continued)

*Primary Examiner* — Alan B Waits
(74) *Attorney, Agent, or Firm* — Sughrue Mion, PLLC

(57) ABSTRACT

An insulated bearing includes a pair of bearing rings arranged concentrically to each other and rolling elements arranged to be rotatable between the pair of bearing rings, at least one of the bearing rings having an insulating layer formed thereon. The one of the bearing rings having the insulating layer formed thereon has an annular groove having an arc-shaped cross section formed on each of both end surfaces of the bearing ring. At least a surface from a non-raceway surface side circumferential surface to the annular groove of the bearing ring is covered by the insulating layer. The insulating layer is a ceramic thermal sprayed layer.

10 Claims, 19 Drawing Sheets

(51) Int. Cl.
*F16C 33/64* (2006.01)
*F16C 33/58* (2006.01)
*F16C 33/62* (2006.01)
*F16C 35/077* (2006.01)

(52) U.S. Cl.
CPC ............ *F16C 33/64* (2013.01); *F16C 35/077* (2013.01); *F16C 2380/26* (2013.01)

(58) Field of Classification Search
CPC ...... F16C 33/58; F16C 33/583; F16C 35/077; H02K 5/173
See application file for complete search history.

(56) References Cited

U.S. PATENT DOCUMENTS

| | | | | |
|---|---|---|---|---|
| 7,503,697 | B2 * | 3/2009 | Tsuji | F16C 19/52 384/476 |
| 8,172,463 | B2 * | 5/2012 | Nakajima | F16C 33/64 29/898.12 |
| 8,425,120 | B2 * | 4/2013 | Konno | F16C 19/52 384/476 |
| 9,581,203 | B2 * | 2/2017 | White | F16C 41/002 |
| 9,646,737 | B2 * | 5/2017 | Martin | C23C 4/11 |
| 9,850,956 | B2 * | 12/2017 | Berens | F16C 19/06 |
| 2004/0066997 | A1 | 4/2004 | Inukai et al. | |
| 2005/0094910 | A1 * | 5/2005 | Tsuji | F16C 19/52 384/476 |
| 2009/0304318 | A1 * | 12/2009 | Konno | F16C 19/52 384/492 |
| 2015/0380124 | A1 | 12/2015 | Martin et al. | |

FOREIGN PATENT DOCUMENTS

| | | | | |
|---|---|---|---|---|
| CN | 105229321 | A | | 1/2016 |
| DE | 3023811 | A | * | 1/1981 |
| JP | 64-38320 | U | | 3/1989 |
| JP | 6-43352 | U | | 6/1994 |
| JP | 9-88972 | A | | 3/1997 |
| JP | 2000-145796 | A | | 5/2000 |
| JP | 2004-308735 | A | | 11/2004 |
| JP | 2006-77944 | A | | 3/2006 |
| JP | 2006-329366 | A | | 12/2006 |
| JP | 2007211893 | A | * | 8/2007 ............ F16C 33/785 |
| JP | 2008223996 | A | * | 9/2008 ............ F16C 33/783 |

OTHER PUBLICATIONS

Machine Translation of JP-2007211893-A (Year: 2007).*
Machine Translation of DE-3023811-A (Year: 1981).*
Communication dated Feb. 18, 2019, issued by the European Patent Office in counterpart European Application No. 17782447.1.
Search Report dated Jun. 6, 2017, issued by the International Searching Authority in counterpart International Patent Application No. PCT/JP2017/015034 (PCT/ISA/210).
Written Opinion dated Jun. 6, 2017, issued by the International Searching Authority in counterpart International Patent Application No. PCT/JP2017/015034 (PCT/ISA/237).

* cited by examiner

INSULATED BEARING

TECHNICAL FIELD

The present invention relates to an insulated bearing.

BACKGROUND ART

A bearing used in an ordinary industrial motor, etc. may suffer from early damage due to high-voltage electricity flowing inside the bearing (hereinafter referred to as "electrolytic corrosion"). Conventional means for solving such problem include forming an insulating layer on at least one of an inner ring and an outer ring, so as to shutter the flow of current.

FIG. 17 illustrates an example of an insulated bearing having an insulating layer formed on an outer ring thereof. The insulated bearing 400 has an inner ring 403, an outer ring 405, and a rolling element (ball) 409, and an insulating layer 415 is formed on an outer circumferential surface 411 and axial end surfaces 413A, 413B of the outer ring 405 and includes a ceramic material. Since the outer ring 405 is in contact with a housing 417 via the insulating layer 415, the outer ring 405 and the housing 417 are insulated from each other. The insulating layer 415 prevents the flow of current from the housing 417 side to the inside of the bearing.

As illustrated in FIG. 18, Patent Document 1 proposes an insulated bearing having the above insulating layer 415, where edges 411a, 411b of the axial end surfaces 413A, 413B of the outer ring are chamfered. According to this insulated bearing, the axial end surfaces 413A, 413B of the bearing do not have sharp end portions. Therefore, sparks do not occur and electrolytic corrosion is prevented between the edge 411a of the axial end surface 413A and the housing 421 and between the edge 411b of the axial end surface 413B and the housing 417.

CITATION LIST

Patent Document

Patent Document 1: JP-A-2006-329366

SUMMARY

Problems to be Solved

However, when forming the insulating layer 415 of Patent Document 1 as illustrated in FIG. 18 by thermal spraying according to the method as illustrated in FIG. 19, the insulating layer 415 becomes extremely thin on terminal end portions 415a, 415b, which causes positions where the insulating layer 415 does not hardly formed in some cases. Therefore, there is a risk that mechanical strength deteriorates on the terminal end portions 415a, 415b of the insulating layer 415, which causes creeping discharge and lowering of the breakdown voltage of the coating itself.

In the case where a high potential difference occurs between the insulated bearing 400 and the housing 417, creeping discharge may occur on the surface of the insulating layer 415 formed on the outer ring 405, and current may flow between the housing 417 and apart 419 of the outer ring 405 without the insulating layer 415 formed thereon. Since current flowing inside a bearing causes rapid deterioration of the bearing, there is a problem that the duration of the insulated bearing 400 may be significantly shortened particularly when used under a high-voltage environment.

Accordingly, the present invention aims to solve the above problem of a conventional insulated bearing, and an object thereof is to provide an insulated bearing, that has a sufficient thickness even on terminal end portions of an insulating layer, and thus is capable of preventing deterioration of mechanical strength of the insulating layer and has excellent electrolytic corrosion resistance; and that is unlikely to cause creeping discharge even in use under an environment applied with a high voltage, and thus is capable of preventing lowering of the breakage voltage.

Means for Solving Problems

The present invention has the following configurations.

(1) An insulated bearing includes a pair of bearing rings arranged concentrically to each other and rolling elements arranged to be rotatable between the pair of bearing rings. At least one of the bearing rings has an insulating layer formed thereon. The one of the bearing rings having the insulating layer formed thereon has an annular groove having an arc-shaped cross section formed on each of both end surfaces of the one of the bearing ring. At least a surface from a non-raceway surface side circumferential surface to the annular groove of the one of the bearing ring is covered by the insulating layer.

(2) In the insulated bearing according to (1), each of the end surfaces of the bearing ring having the insulating layer formed thereon includes the non-raceway surface side end surface, a raceway surface side end surface, and the annular groove formed between the non-raceway surface side circumferential surface and the raceway surface side end surface. An axial width between the non-raceway surface side end surfaces is larger than an axial width between the raceway surface side end surfaces, and the annular groove and the non-raceway surface side end surface are connected to each other via an inclined surface.

According to the insulated bearing having the above configuration, since the annular groove and the non-raceway surface side end surface are connected to each other via an inclined surface, in the case where the insulating layer is formed through thermal spraying, the insulating layer can be continuously formed within a range from the non-raceway surface side circumferential surface to the annular groove of the bearing ring. Further, the thermal spraying material becomes likely to accumulate inside the annular groove, and thus becomes unlikely to approach a raceway surface side circumferential surface of the bearing ring. Accordingly, it is possible to present a coating from being formed on the raceway surface side circumferential surface of the bearing ring, and to form the insulating layer at a sufficient thickness. Further, the axial width between the non-raceway surface side end surfaces larger than the axial width between the raceway surface side end surfaces of the bearing ring suppresses creeping discharge in the case where the housing is also fitted to the end surfaces of the bearing ring. Therefore, lowering of the breakage voltage due to creeping discharge can be prevented, which obtains a high electrolytic corrosion prevention effect.

(3) In the insulated bearing according to (2), a cross-sectional shape of one of the annular grooves and one of the inclined surfaces is a composite arc obtained by compounding two single arcs, the single arcs being, smoothly connected to each other.

According to the insulated bearing having the above configuration, in the case where the insulating layer is formed through thermal spraying, it is possible to securely form an insulating layer smoothly connected to the annular groove and the inclined surface.

(4) In the insulated bearing according to (3), the single arcs of the composite arc have a tangent line in common with each other at a joining point of the single arcs.

According to the insulated bearing having the above configuration, the cross-sectional shape of the annular groove and the inclined surface becomes a composite arc that is connected more smoothly.

(5) In the insulated bearing according to any one of (1) to (4), the insulating layer is a ceramic thermal sprayed layer.

According to the insulated bearing having the above configuration, it is possible to obtain a comparatively large electric resistance, and to obtain excellent electrical insulation even at a thin coating thickness. Further, damages such as breakage and chipping become unlikely to occur.

Effect of Invention

According to the present invention, it is possible to continuously form the insulating layer within the range from the non-raceway surface side circumferential surface of the bearing ring to the annular grooves formed on both end surfaces of the bearing ring, and to maintain a sufficient thickness of the insulating layer even at the terminal end portions of the insulating layer, which prevents deterioration of mechanical strength of the insulating layer. Further, it is possible to prevent deterioration of the breakage voltage due to creeping discharge, which obtains a high creeping discharge prevention effect.

DETAILED DESCRIPTION OF ILLUSTRATIVE EMBODIMENTS

Hereinafter, embodiments of the present invention will be described in detail with reference to the drawings. The insulated bearing described herein may be suitably used in an environment where current may flow inside the bearing, such as a bearing mounted in an ordinary industrial motor, a motor for railway vehicle traction, and speed increasing machine for windmill.

First Embodiment

Figure 1:
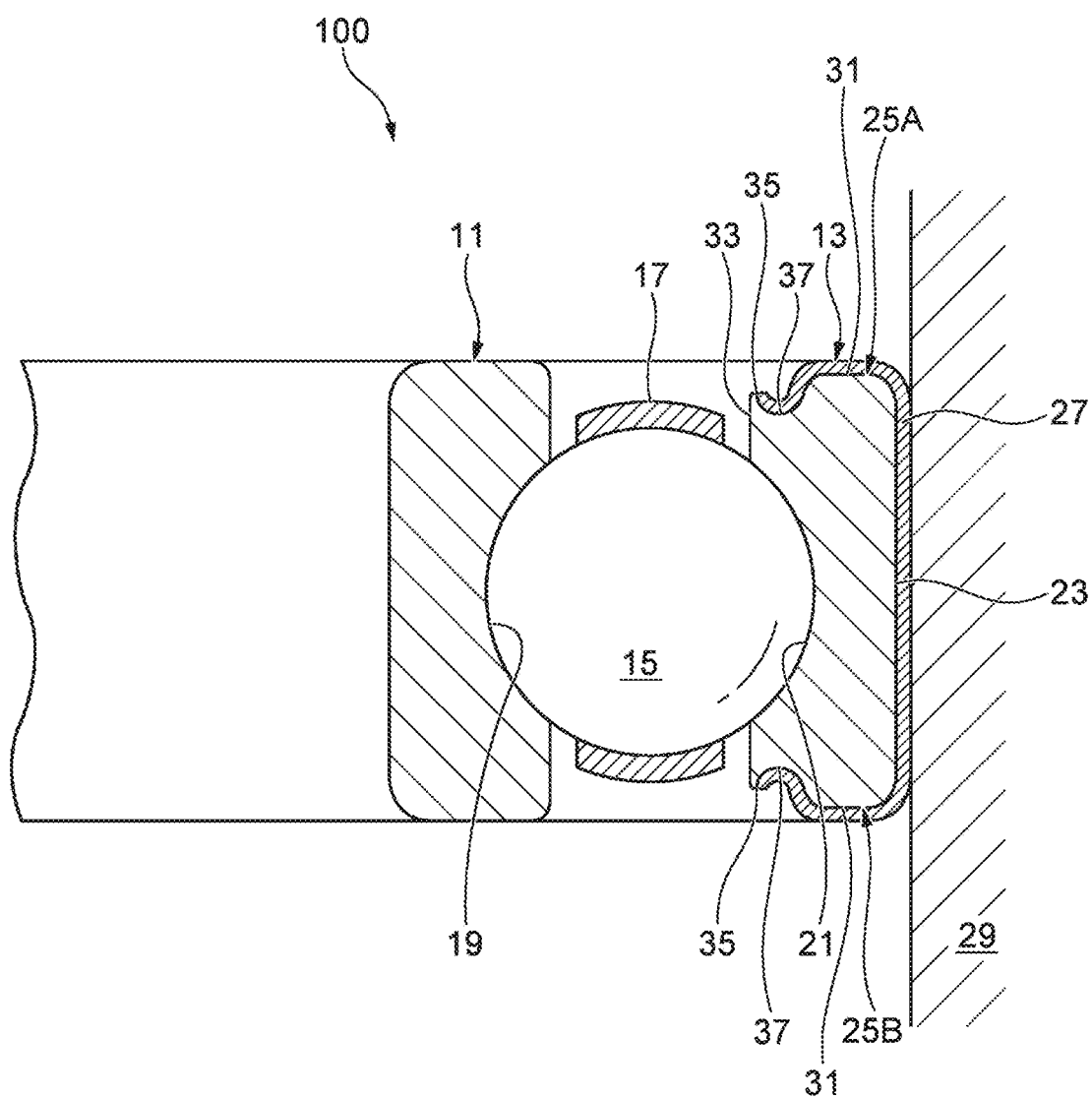
FIG. 1 is a partial cross-sectional view of a part of an axial cross section of an insulated bearing according to a first embodiment.

FIG. 1 is a partial cross-sectional view of a part of an axial cross section of an insulated bearing 100 according to a first embodiment.

The insulated bearing 100 has: a pair of bearing rings including an inner ring 11 and an outer ring 13 arranged concentrically to each other; a rolling element (ball) 15; and a holder 17. The rolling element 15 is housed in a pocket of the holder 17, and is arranged rollably between the bearing rings, i.e. between an inner ring raceway surface 19 of the inner ring 11 and an outer ring raceway surface 21 of the outer ring 13.

The outer ring 13 has an insulating layer 27 formed thereon as described below. The outer ring 13 is fixed to a housing (or shaft) 29 via this insulating layer 27. The inner ring 11, the outer ring 13, and the rolling element 15 are formed of a metallic conductor material such as steel.

Figure 2:
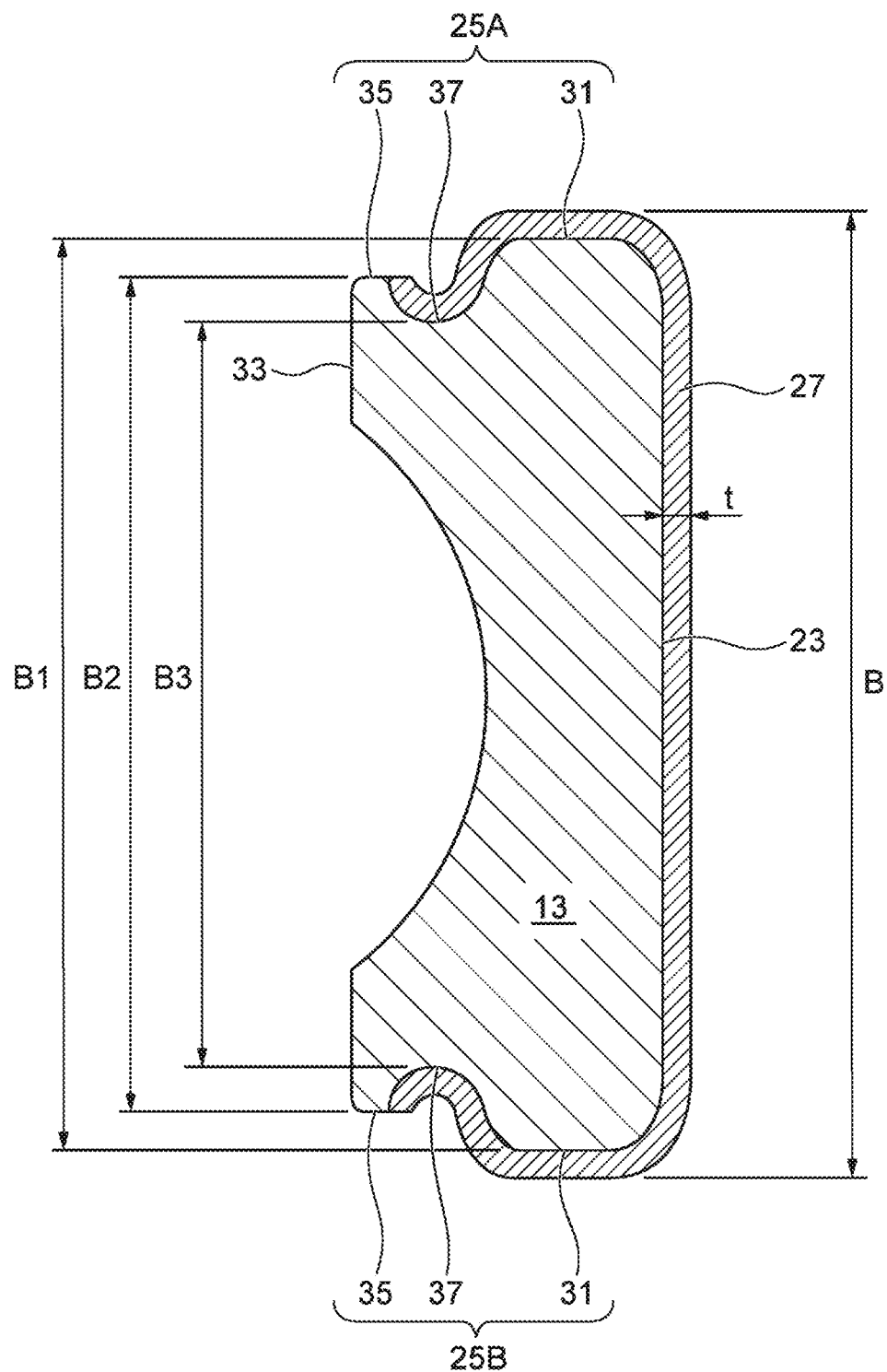
FIG. 2 is an enlarged cross-sectional view of an outer ring as illustrated in FIG. 1.

FIG. 2 is an enlarged cross-sectional view of the outer ring 13 as illustrated in FIG. 1.

Each of both end surfaces of the outer ring 13, that are a pair of axial end surfaces 25A, 25B, include: an outer ring outer circumferential side end surface non-raceway surface side end surface) 31 which is connected to an outer ring outer circumferential surface (non-raceway surface side circumferential surface) 23; an outer ring, inner circumferential side end surface (raceway surface side end surface) 35 which is connected to an outer ring inner circumferential surface 33; and an outer ring annular groove 37 which has an arc-shaped cross section and which is formed by spanning the entire circumference in the circumferential direction between the outer ring outer circumferential side end surface 31 and the outer ring inner circumferential side end surface 35.

An axial width B2 between the pair of the outer ring inner circumferential side end surfaces 35 is narrower than an axial width B1 between the pair of the outer ring outer circumferential side end surfaces 31. Further, an axial width B3 between groove bottom portions of the pair of the outer ring annular grooves 37 is narrower than the axial width B2 between the pair of the outer ring inner circumferential side end surfaces 35. That is, the outer ring annular grooves 37 are formed in a manner that the outer ring annular grooves 37 are concaved toward an axially inner side from the outer ring inner circumferential side end surfaces 35. The outer ring inner circumferential side end surfaces 35 may be inclined with respect to the axial direction, and in this case, the axial width B3 between groove bottom portions of the pair of the outer ring annular grooves 37 is set narrower than the axial width B2 between the pair of the outer ring inner circumferential side end surfaces 35. Accordingly, the thermal spraying material for forming the insulating layer 27 becomes likely to accumulate inside the outer ring annular grooves 37, the insulating layer 27 becomes likely to be formed at a sufficient thickness, and simultaneously, the thermal spraying material does not flow to the outer ring inner circumferential surface 33.

The insulating layer 27 is formed at a sufficient thickness t on the entire circumference of the outer ring outer circumferential surface 23, and on the pair of outer ring outer circumferential side end surfaces 31 and the pair of outer ring annular grooves 37 within the axial end surfaces 25A, 25B. In the present embodiment, the insulating layer 27 is a ceramic thermal sprayed layer. A ceramic has a high insulation effect, and thus has excellent insulation even at a thin coating thickness. It also has a property such that damages such as breakage and chipping are unlikely to occur. The insulating layer 27 is preferably a coating formed by thermal spraying with a ceramic as a thermal spraying material, but may also be formed with another material as long as it is a layer having the same function.

Figure 19:
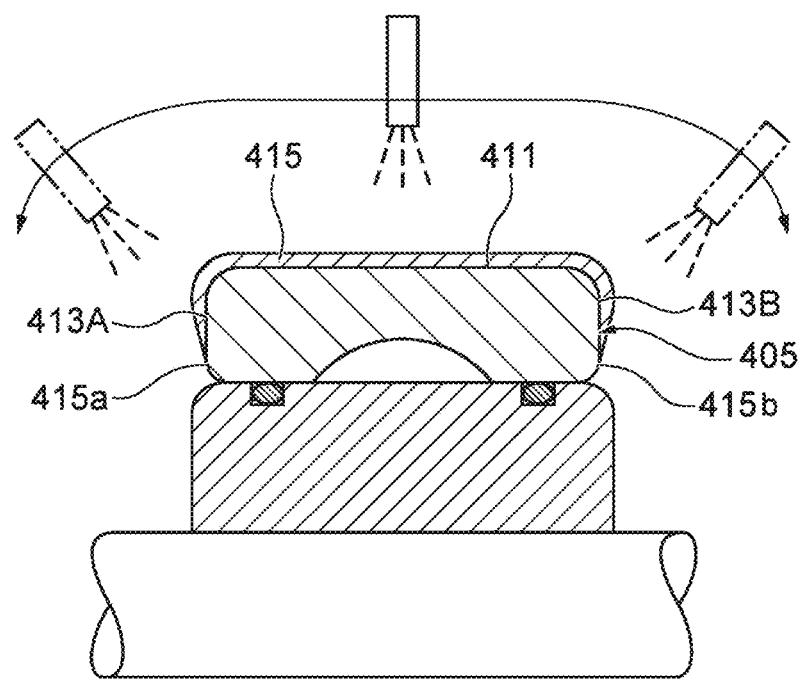
FIG. 19 is an illustrative view schematically illustrating a coating forming process of the insulating layer of the insulated bearing.

Examples of the thermal spraying method for forming the insulating layer 27 include a plasma thermal spraying method using a plasma as an energy source, heating a ceramic material for forming the insulating layer 27 to a melted state, and blowing down the ceramic material to an annular member. Other than this thermal spraying method, the insulating layer 27 may also be formed by using various methods such as are thermal spraying, flame thermal spraying, and laser thermal spraying. Examples include, as illustrated in FIG. 19, forming the insulating layer 27 (the insulating layer 415 in FIG. 19) by a thermal spraying method as described in JP-A-2006-77944.

The insulating layer 27 of the insulated bearing 100 of the present configuration has a thickness of 10 μm or more at its thinnest position. With the thickness of the insulating layer 27 on the outer ring outer circumferential surface 23 (preferably 50 μm to 250 μm) as a design reference value, the thickness of the insulating layer on the outer ring annular groove 37 has a thickness of 20% or more of the design reference value (i.e. 10 μm or more) even at its thinnest position.

The thickness t of the insulating layer 27 is set such that a width B of the outer ring 13 inclusive of the insulating layer 27 is equal to a width of the inner ring 11.

Figure 3:
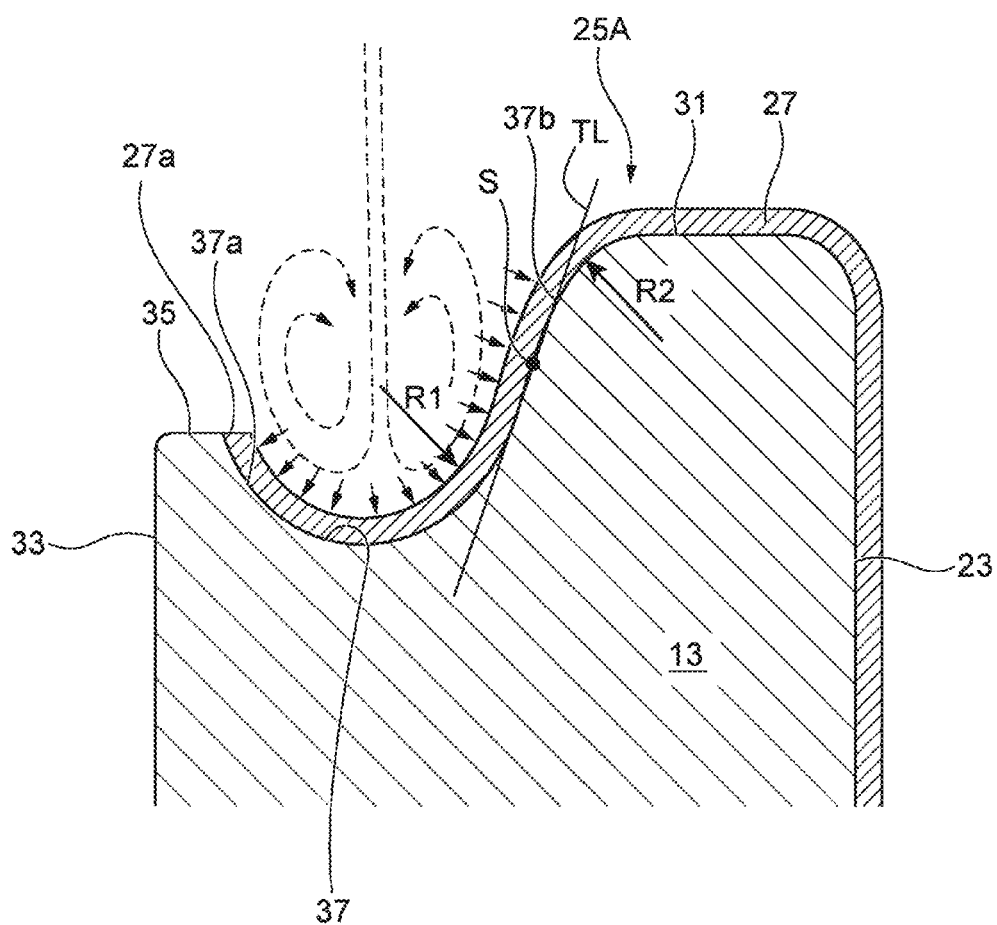
FIG. 3 is an illustrative view schematically illustrating a state when an insulating layer is formed on an axial end surface of the outer ring.

As illustrated in FIG. 3, with the outer ring annular groove 37 existing on the axial end surface 25A (in a similar way on 25B), during thermal spraying, liquid particles of the thermal spraying material injected from a nozzle are likely to accumulate in the outer ring annular groove 37. That is, liquid particles of the thermal spraying material are attached to the entire inside of the groove, inclusive of a groove wall surface 37a on the outer ring inner circumferential surface 33 side and a groove wall surface 37b (inclined surface) on the outer ring outer circumferential surface 23 side of the outer ring annular groove 37, and the insulating layer 27 is formed continuously on the groove wall surfaces 37a, 37b and the outer ring annular groove 37. In this case, the liquid particles of the thermal spraying material accumulate in the outer ring annular groove 37, and thus are unlikely to approach the outer ring inner circumferential surface 33. Accordingly, it is possible to prevent a coating from being formed on the outer ring inner circumferential surface 33. Further, since the insulating layer is not formed on the outer ring inner circumferential surface 33, an operation of removing the insulating layer from the outer ring inner circumferential surface 33 is unnecessary. If there is a coating on the outer ring inner circumferential surface 33, during rotation of the bearing, the coating may fall off due to contact with the outer diameter of the holder or sliding resistance of a lubricant, and when the fallen coating enters into the raceway surface of the bearing, the bearing may be damaged.

The groove wall surface 37b is preferably a gently inclined surface. The reason thereof is that if the groove wall surface 37b is a steep inclined surface, during thermal spraying, liquid particles of the thermal spraying material do not stay on the inclined surface, and thus the insulating layer 27 on the groove wall surface 37b may become thin. The outer ring annular groove 37 and the groove wall surface 37b more preferably have a composite arc shape obtained by compounding two single arcs R1 and R2. The two single arcs R1, R2 in the cross-sectional shape of the outer ring annular groove 37 and the groove wall surface 37b have a tangent line TL in common with each other at a joining point S of the single arcs R1, R2. Further, the joining point S of the single arcs R1, R2 is preferably disposed on an axially inner side of the bearing from the outer ring inner circumferential side end surface 35, which is a lateral surface of the outer ring inner circumferential surface 33.

The position of the composite arc set as above provides a smooth groove wall surface 37b, which prevents the insulating layer 27 on the groove wall surface 37b from being excessively thin and ensures an appropriate coating thickness. Further, an operation of removing the insulating layer from the outer ring inner circumferential surface 33 is unnecessary.

According to the above insulated bearing 100 of the present configuration, the insulating layer 27 is formed at a sufficient thickness and obtains a necessary insulation resistance within a range from the outer ring outer circumferential surface 23 to the outer ring annular grooves 37 on the axial end surfaces 25A, 25B. Therefore, not only creeping discharge, but also lowering of the breakage voltage due to coating breakage of the insulating layer 27 can be prevented.

The axial width B2 between the pair of the outer ring inner circumferential side end surfaces 35 is set narrower than the axial width B1 between the pair of the outer ring outer circumferential side end surfaces 31, as illustrated in FIG. 2, the embodiment increases the distance between the housing (or shaft) 29 (see FIG. 1) and the coating end portions of the insulating layer 27, and further raises the breakage voltage due to creeping discharge.

Modification of First Embodiment

A modification of the insulated bearing according to the above first embodiment is described hereinafter. In the following description, the same reference numerals are given to the same members and the same portions, and description thereof will be omitted or simplified.

(First Modification)

Figure 4:
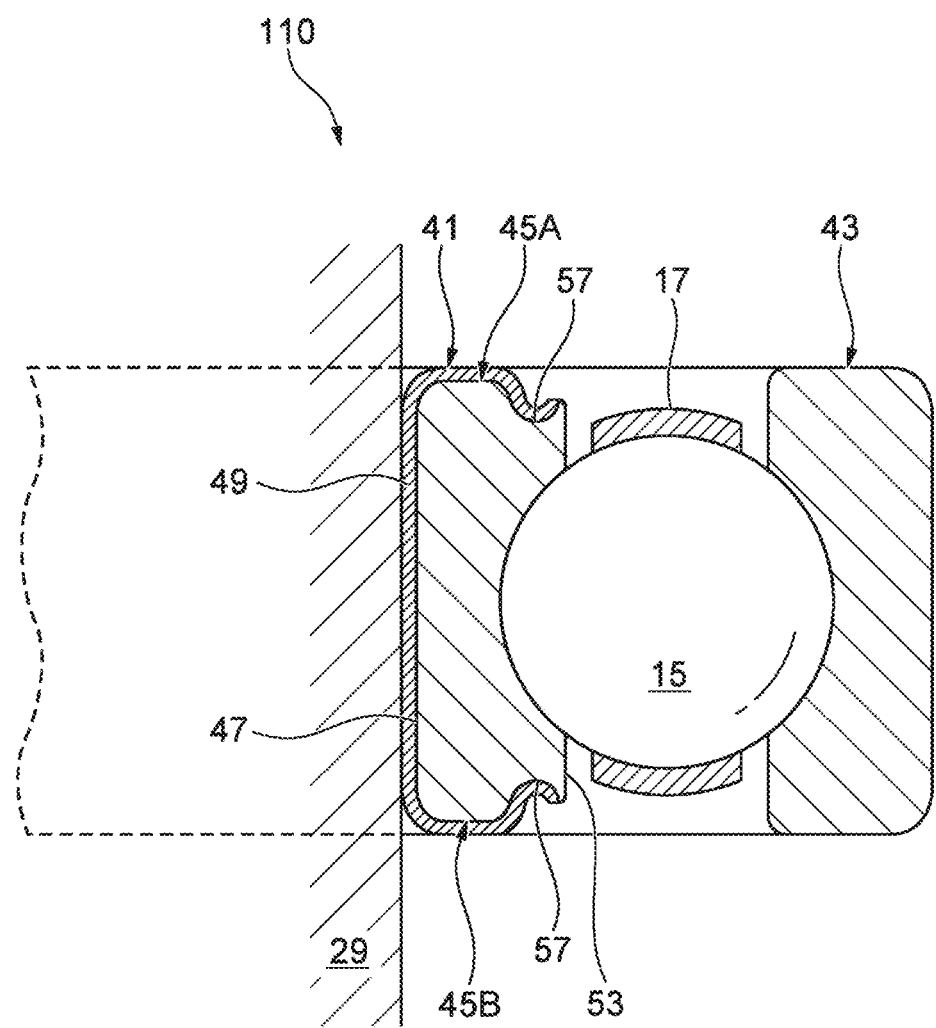
FIG. 4 is a partial cross-sectional view of a first modification of the insulated bearing according to the first embodiment.

FIG. 4 is a partial cross-sectional view of a first modification of the insulated bearing according to the first embodiment. The insulated bearing 110 of the present modification has: an inner ring 41; an outer ring 43; a rolling element (ball) 15; and a holder 17. The inner ring 41 has an insulating layer 49 formed thereon to be described below. The inner ring 41 is fixed to a housing (or shaft) 29 via this insulating layer 49.

Figure 5:
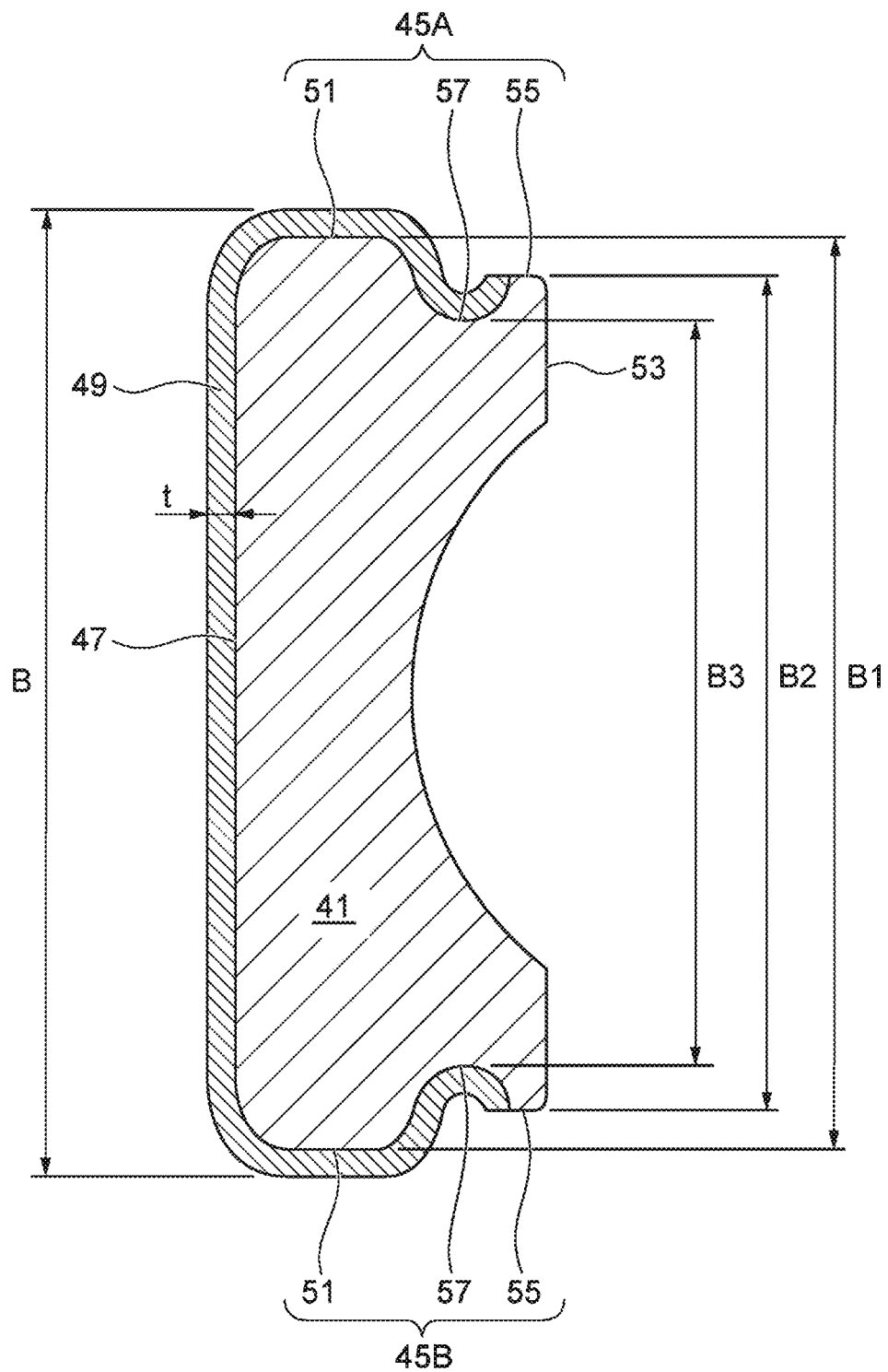
FIG. 5 is an enlarged cross-sectional view of an inner ring as illustrated in FIG. 4.

FIG. 5 is an enlarged cross-sectional view of the inner ring 41 as illustrated in FIG. 4.

Each of a pair of axial end surfaces 45A, 45B of the inner ring 41 include: an inner ring inner circumferential side end surface (non-raceway surface side end surface) 51 which is connected to an inner ring inner circumferential surface (non-raceway surface side circumferential surface) 47; an inner ring outer circumferential side end surface (raceway surface side end surface) 55 which is connected to an inner ring outer circumferential surface 53; and an inner ring annular groove 57 which is formed by spanning the entire circumference in the circumferential direction between the inner ring inner circumferential side end surface 51 and the inner ring outer circumferential side end surface 55.

That is, instead of the above configuration that the insulating layer is formed on the outer ring, the insulated bearing 110 of the present first modification has a configuration that the insulating layer 49 is formed on the inner ring inner circumferential surface 47, the inner ring inner circumferential side end surfaces 51, 51, and the inner ring annular grooves 57 of the inner ring 41, without an insulating layer formed on the outer ring 43. During a thermal spraying process of the insulated bearing 110 of the present first modification, an insulating material is thermally sprayed toward the inner ring inner circumferential surface 47, the inner ring inner circumferential side end surfaces 51, 51, and the inner ring annular grooves 57, so as to form the insulating layer 49.

In this case as well, an axial width B2 between the pair of the inner ring outer circumferential side end surfaces 55 is narrower than an axial width B1 between the pair of the inner ring inner circumferential side end surfaces 51. Further, an axial width B3 between groove bottom portions of the pair of the inner ring annular grooves 57 is narrower than the axial width B2 (minimum axial width) of the pair of the inner ring outer circumferential side end surfaces 55. That is, the inner ring annular grooves 57 are formed in a manner that the inner ring annular grooves 57 are concaved toward an axially inner side from the inner ring outer circumferential side end surfaces 55.

According to the above insulated bearing 110 of the present first modification, the insulating layer 49 is formed at a sufficient thickness within a range from the inner ring inner circumferential surface 47 to the inner ring annular grooves 57 on the axial end surfaces 45A, 45B. Therefore, deterioration of mechanical strength of the insulating layer 49 and lowering of the breakage voltage due to creeping discharge can be prevented.

The axial width B2 between the pair of the inner ring outer circumferential side end surfaces 55 is set narrower than the axial width B1 between the pair of the inner ring inner circumferential side end surfaces 51, as illustrated in FIG. 5, the embodiment increases the distance between the housing (or shaft) 29 (see FIG. 4) and the coating end portions of the insulating layer 49, and further raises the breakage voltage due to creeping discharge.

As described above, the insulating layer formed on at least one of the inner rings 11, 41 and the outer rings 13, 43 prevents occurrence of electrolytic corrosion.

(Second Modification)

Figure 6:
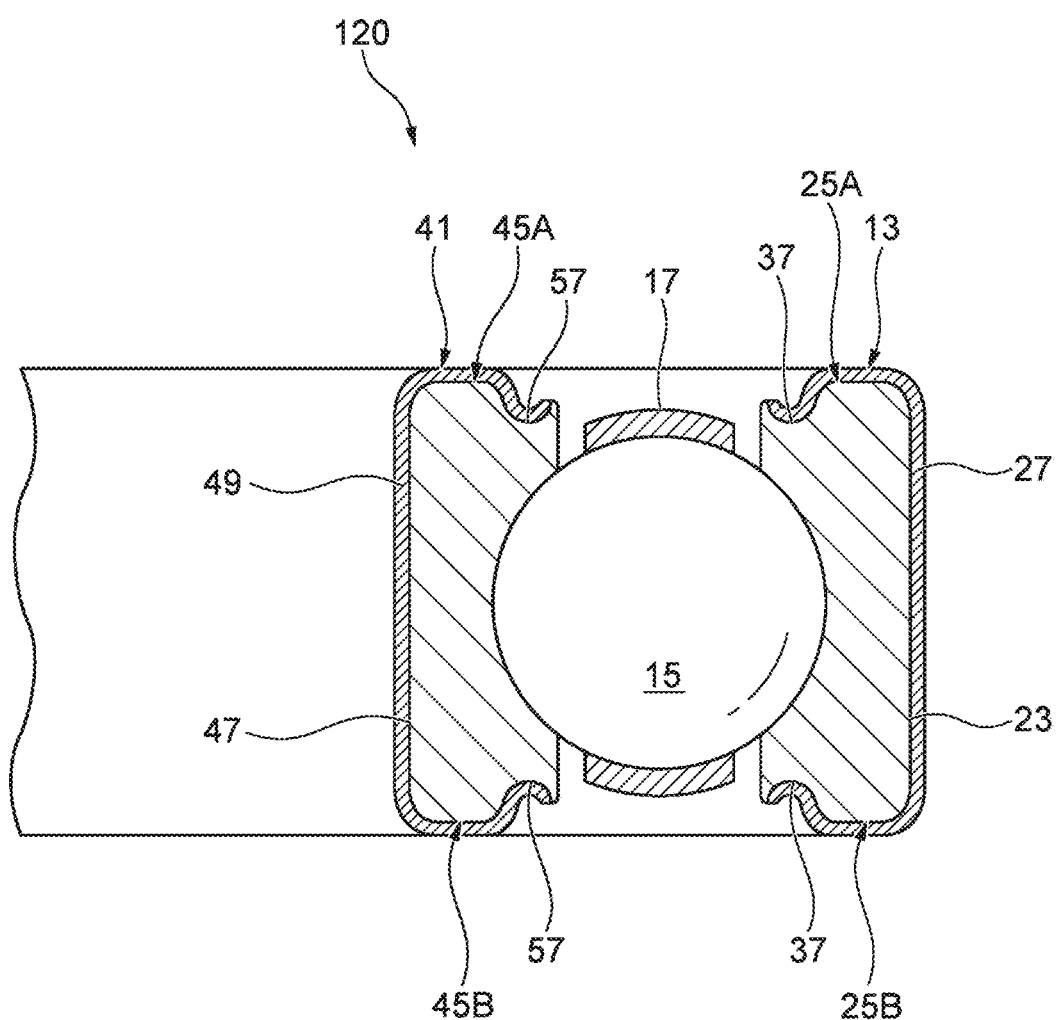
FIG. 6 is a partial cross-sectional view of a second modification of the insulated bearing according to the first embodiment.

FIG. 6 is a partial cross-sectional view of a second modification of the insulated bearing according to the first embodiment.

The insulated bearing 120 of the present modification has: the inner ring 41 of the above first modification; the outer ring 13 of the above first embodiment; a rolling element (ball) 15; and a holder 17.

The inner ring 41 has inner ring annular grooves 57 formed thereon, and the outer ring 13 has outer ring annular grooves 37 formed thereon. Further, the inner ring 41 has an insulating layer 49 formed by spanning the entire circumference in the circumferential direction of an inner ring inner circumferential surface 47 and a portion on the side connected to the inner ring inner circumferential surface 47 of each of a pair of axial end surfaces 45A, 45B (the inner ring inner circumferential side end surfaces 51 and the inner ring annular grooves 57 as illustrated in FIG. 5). Moreover, the outer ring 13 has an insulating layer 27 formed by spanning the entire circumference in the circumferential direction of an outer ring outer circumferential surface 23 and a portion on the side connected to the outer ring outer circumferential surface 23 of each of a pair of axial end surfaces 25A, 25B (the outer ring outer circumferential side end surfaces 31 and the outer ring annular grooves 37 as illustrated in FIG. 2).

The inner ring 41 is fixed to a housing (or shaft) via the insulating layer 49 while the housing (or shaft) is not illustrated, and the outer ring 13 is fixed to a shaft (or housing) via the insulating layer 27 while the shaft (or housing) is not illustrated.

According to the insulated bearing 120 having the above configuration, the insulated bearing 120 is supported by the housing and the shaft via the insulating layers 49 and 27 formed on both the inner ring 41 and the outer ring 13. Therefore, insulation performance of the insulated bearing 120 is enhanced, which prevents more securely occurrence of electrolytic corrosion and lowering of the breakage voltage due to creeping discharge.

Second Embodiment

Figure 7:
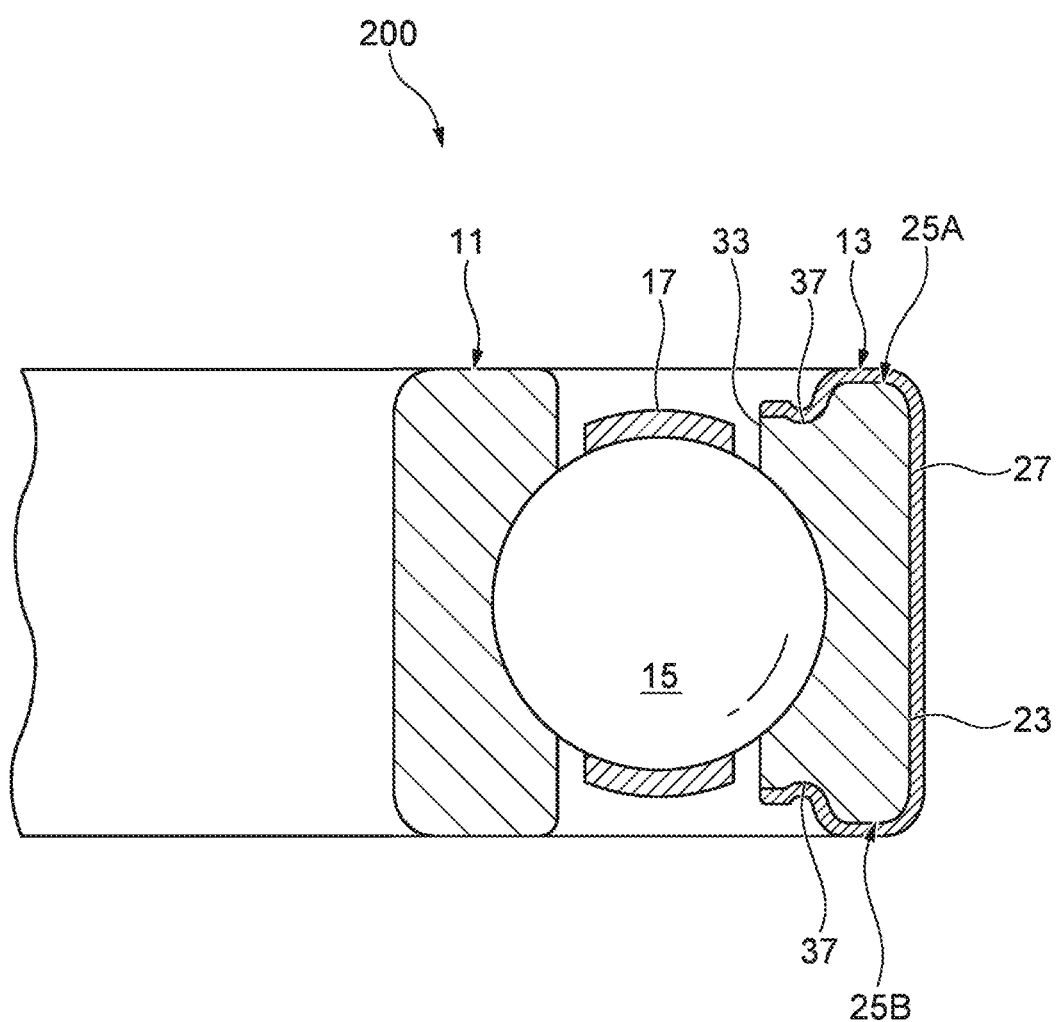
FIG. 7 is a partial cross-sectional view of a part of an axial cross section of an insulated bearing of a second embodiment.
Figure 8:
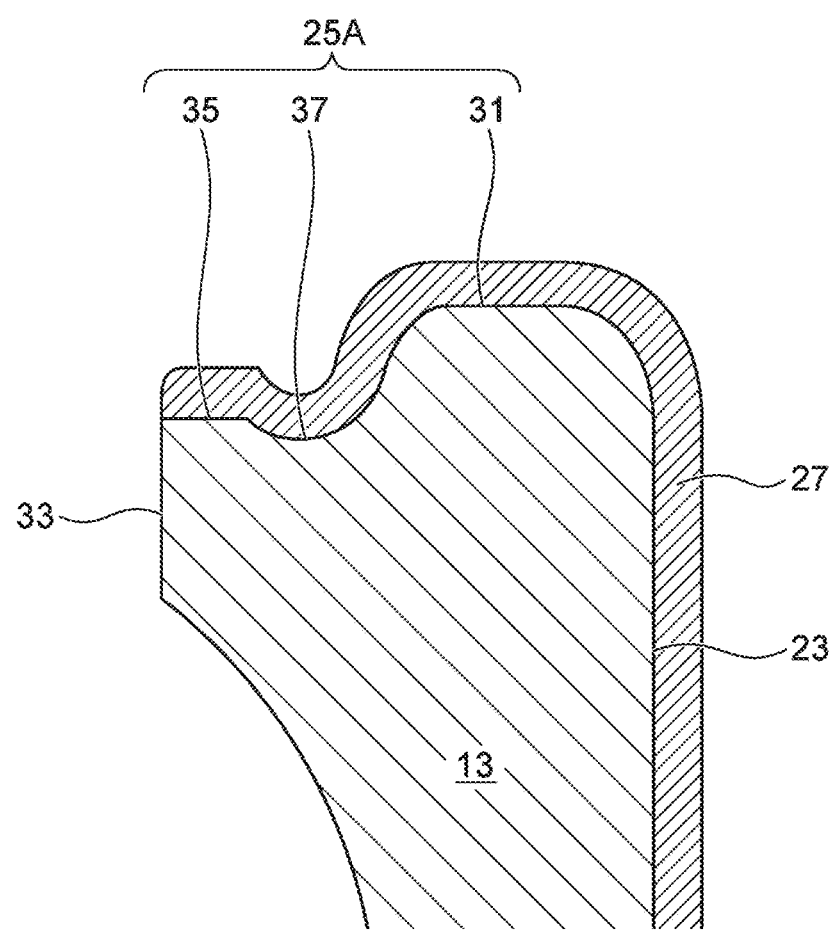
FIG. 8 is a partially enlarged cross-sectional view of an outer ring as illustrated in FIG. 7.

FIG. 7 is a partial cross-sectional view of a part of an axial cross section of an insulated bearing 200 of a second embodiment, and FIG. 8 is a partially enlarged cross-sectional view of the outer ring 13 as illustrated in FIG. 7.

The insulated bearing 200 of the present configuration has the same configuration as the insulated bearing 100 of the above first embodiment, except that the insulating layer 27 of the outer ring 13 is also formed on the outer ring inner circumferential side end surfaces 35 of the axial end surfaces 25A (in a similar way on 25B) as illustrated in FIG. 8.

According to the insulated bearing 200 of the above configuration, the insulating layer 27 is formed in a manner that the insulating layer 27 covers the entire surfaces of the axial end surfaces 25A, 25B inclusive of the outer ring outer circumferential surface 23, and thus has a longer creepage distance from the terminal end portions of the insulating layer 27 to a housing or a shaft as compared with the first embodiment. Thereby, creeping discharge becomes unlikely to occur, and the creeping discharge prevention effect is further enhanced as compared with the insulated bearing 100 of the above first embodiment.

(First Modification)

Figure 9:
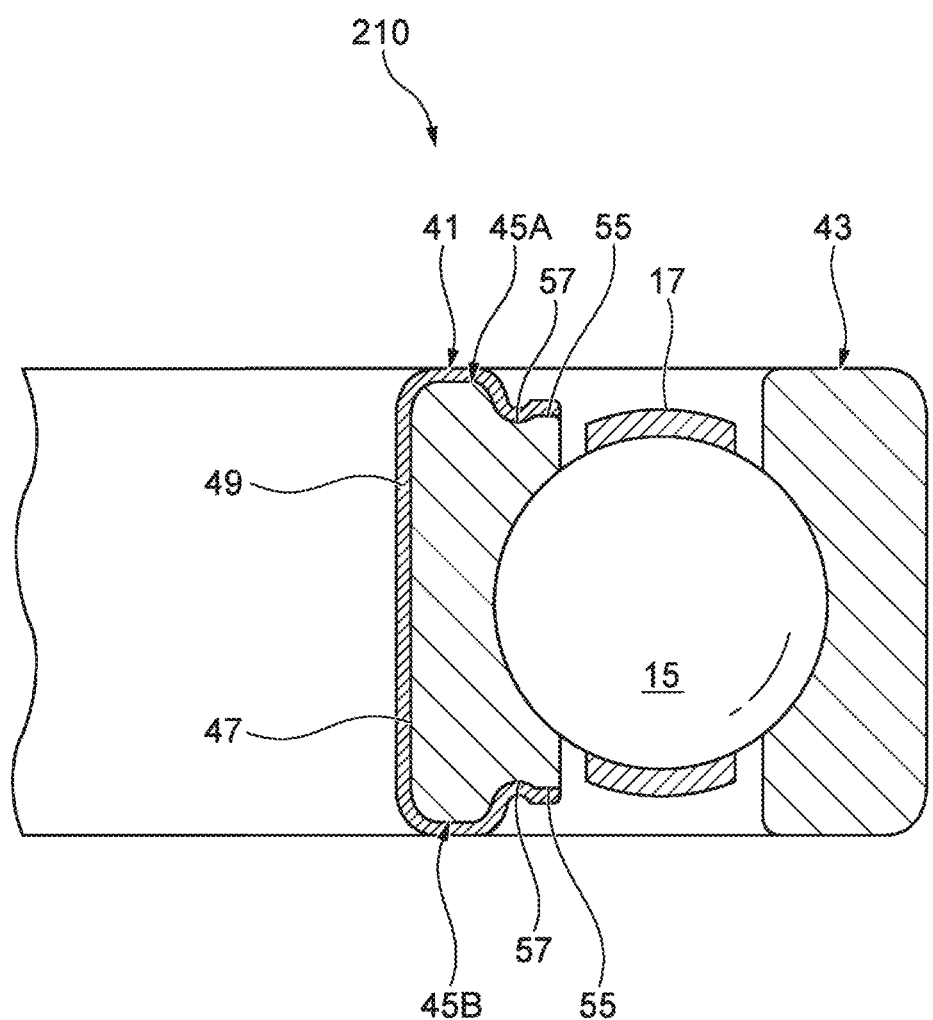
FIG. 9 is a partial cross-sectional view of a first modification of the insulated bearing according to the second embodiment.

FIG. 9 is a partial cross-sectional view of a first modification of the insulated bearing according to the second embodiment. The insulated bearing 210 of the present modification has the same configuration as the insulated bearing 110 of the above first modification of the first embodiment, except that, the insulating layer 49 of the inner ring 41 is also formed on the inner ring outer circumferential side end surfaces 55 of the axial end surfaces 45A, 45B. That is, the insulating layer 49 is formed on the entire surfaces of the axial end surfaces 45A, 45B inclusive of the inner ring outer circumferential side end surfaces 55.

According to the insulated bearing 210 of the above configuration, the creepage distance from the terminal end portions of the insulating layer 49 to a housing or a shaft is longer as compared with the first embodiment, which enhances the creeping discharge prevention effect.

(Second Modification)

Figure 10:
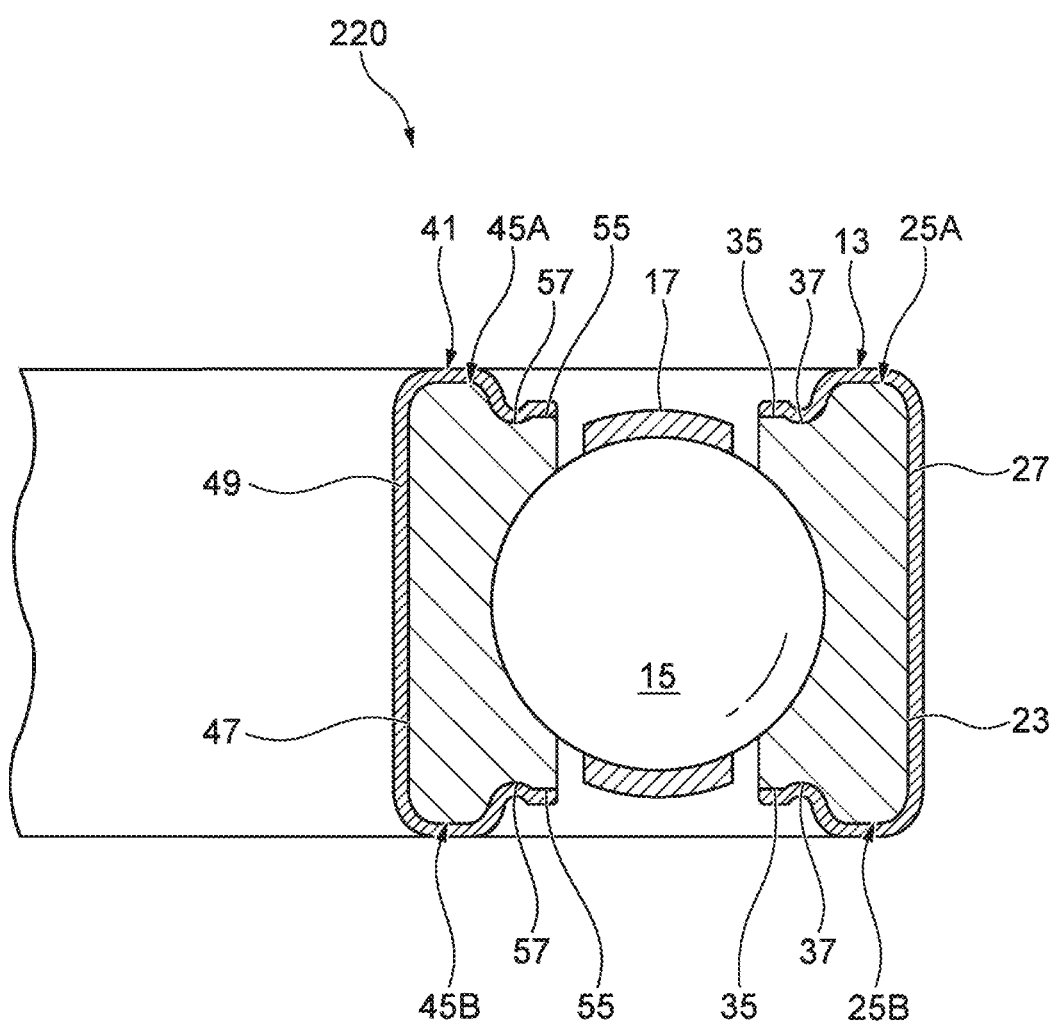
FIG. 10 is a partial cross-sectional view of a second modification of the insulated bearing according to the second embodiment.

FIG. 10 is a partial cross-sectional view of a second modification of the insulated bearing according to the second embodiment. The insulated bearing 220 of the present modification has the same configuration as the insulated bearing 120 of the above second modification of the first embodiment, except that the insulating layer 49 of the inner ring 41 is also formed on the inner ring outer circumferential side end surfaces 55 of the axial end surfaces 45A, 45B, and that the insulating layer 27 of the outer ring 13 is also formed on the outer ring inner circumferential side end surfaces 35 of the axial end surfaces 25A, 25B.

According to the insulated bearing 220 having the above configuration, the creepage distance from the terminal end portions of the insulating layers 27, 49 to a housing or a shaft is longer, and the insulated bearing 220 is supported by the housing or the shaft via the insulating layer 49 of the inner ring 41 and the insulating layer 27 of and the outer ring 13. Therefore, insulation performance of the insulated bearing 220 is further enhanced, which prevents more securely occurrence of electrolytic corrosion and lowering of the breakage voltage due to creeping discharge.

Third Embodiment

Figure 11:
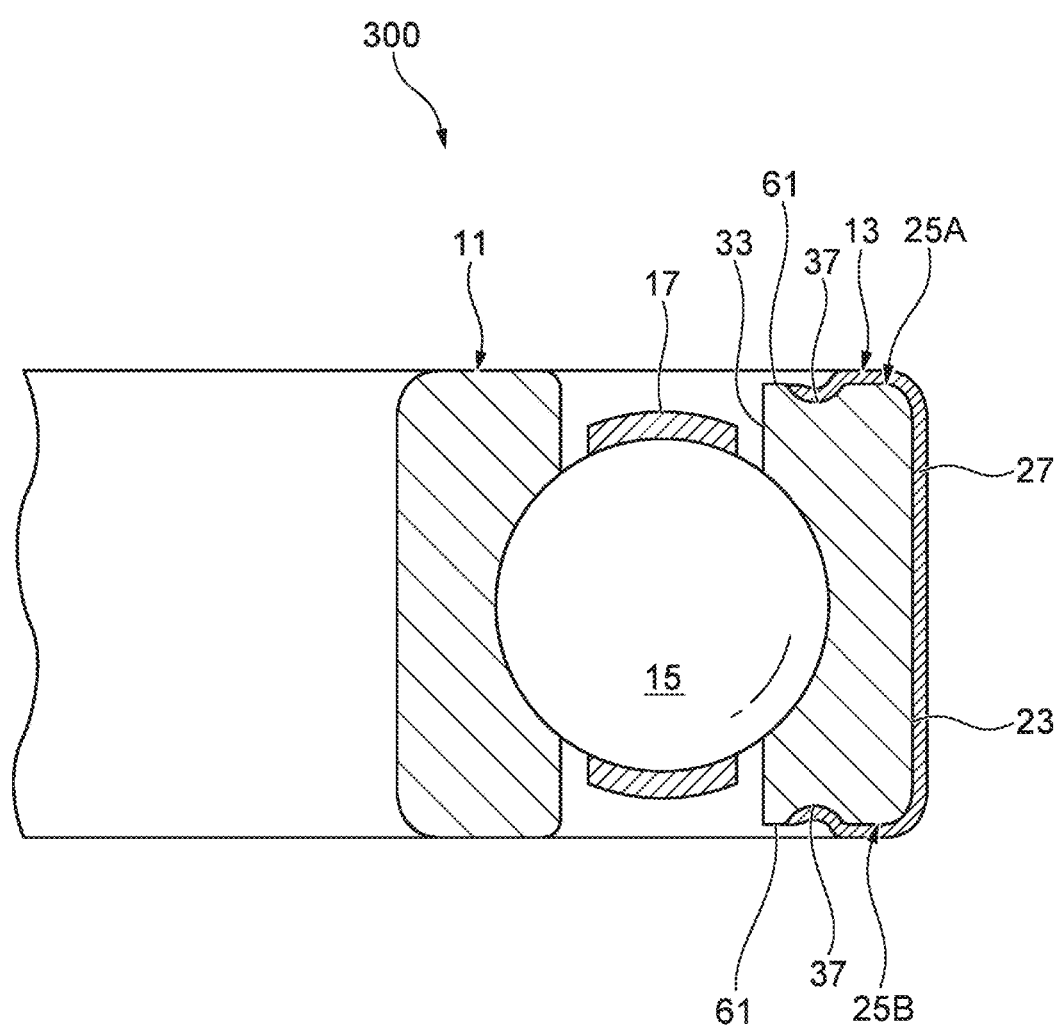
FIG. 11 is a partial cross-sectional view of a part of an axial cross section of an insulated bearing of a third embodiment.
Figure 12:
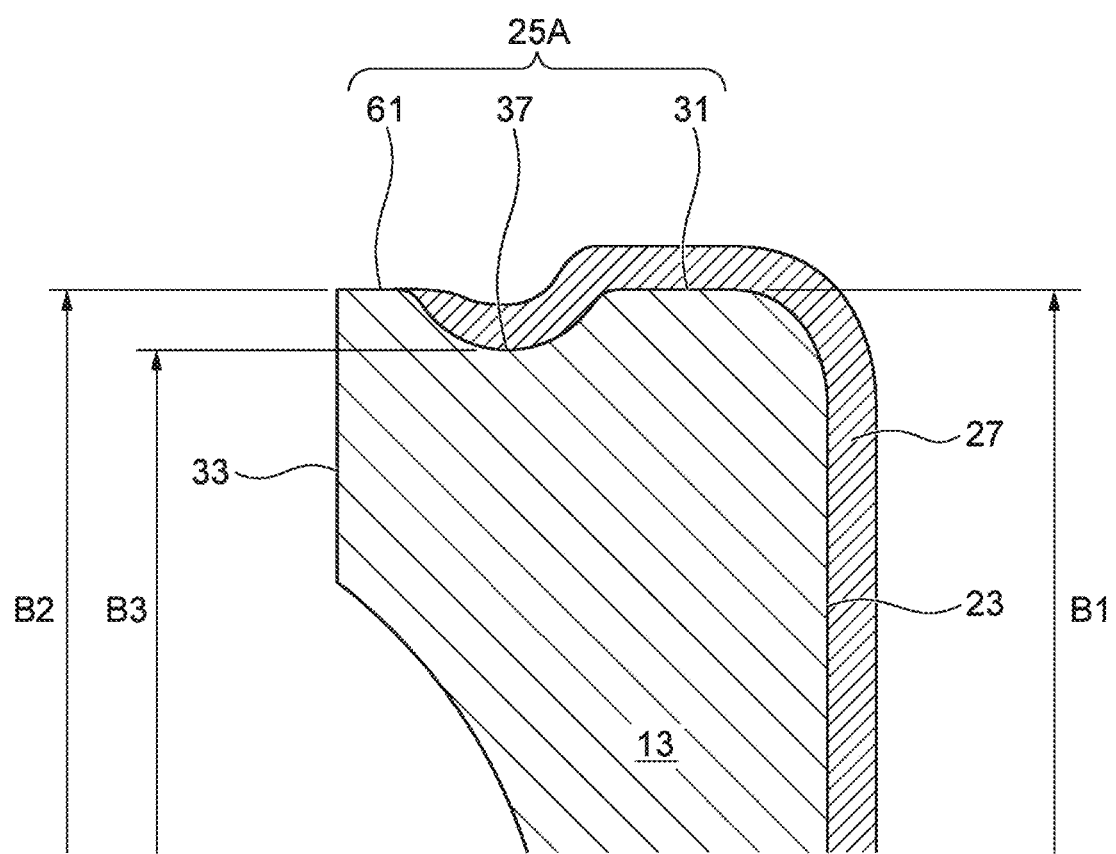
FIG. 12 is a partially enlarged cross-sectional view of an outer ring as illustrated in FIG. 11.

FIG. 11 is a partial cross-sectional view of a part of an axial cross section of an insulated bearing 300 of a third embodiment, and FIG. 12 is a partially enlarged cross-sectional view of the outer ring 13 as illustrated in FIG. 11.

The insulated bearing 300 having the present configuration, as illustrated in FIG. 12, has an axial width B2 between a pair of outer ring inner circumferential side end surfaces 61 that is the same as an axial width B1 between a pair of outer ring outer circumferential side end surfaces 31 of axial end surfaces 25A, 25B of an outer ring 13. Further, an axial width B3 between groove bottom portions of the pair of the outer ring annular grooves 37 is narrower than the axial width B2 between the pair of the outer ring inner circumferential side end surfaces 61. That is, the outer ring annular grooves 37 are formed in a manner that the outer ring annular grooves 37 are concaved toward an axially inner side from the outer ring inner circumferential side end surfaces 61. The other configurations are the same as the insulated bearing 100 of the above first embodiment as illustrated in FIG. 1.

According to the insulated bearing 300 having the above configuration, since the axial width B2 between the pair of outer ring inner circumferential side end surfaces 61 is equal to the axial width B1 between the pair of outer ring outer circumferential side end surfaces 31, the steps on the axial end surfaces 25A, 25B of the outer ring 13 becomes smaller, and the insulating layer 27 becomes unlikely to peel off. Further, since the insulating layer 27 is formed in a manner that the insulating layer 27 covers at least an outer ring outer circumferential surface 23, the outer ring outer circumferential side end surfaces 31, and outer ring annular grooves 37 of the outer ring 13, it is possible to prevent lowering of breakage voltage due to creeping discharge with respect to a housing or a shaft existing on the outer side of the outer ring outer circumferential surface 23.

EXAMPLES

The following describes the result of forming an insulating layer via thermal spraying on the outer ring of the above first embodiment having the outer ring annular grooves formed on the axial end surfaces and, for comparison, the result of forming an insulating layer via thermal spraying on an outer ring without the outer ring annular grooves formed thereon. Here, samples of the above two types of outer rings were enlarged and observed through a microscope.

Figure 13:
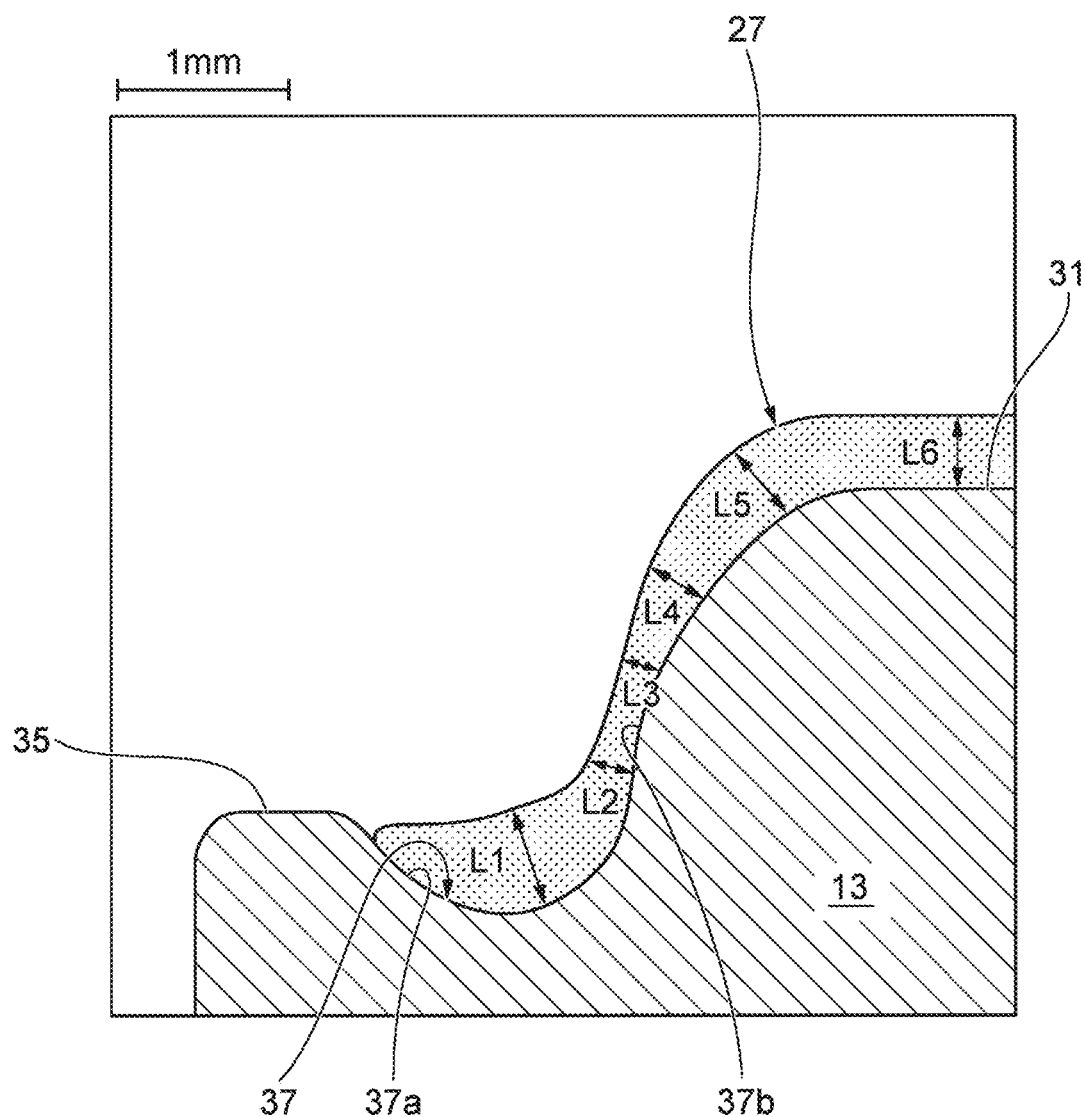
FIG. 13 is a schematic view of a photograph of the present invention illustrating a state where an insulating layer is welded on an outer ring having outer ring annular grooves formed on axial end surfaces thereof.

FIG. 13 is a schematic view of an actually taken photograph of the present invention having an insulating layer welded on an outer ring having outer ring annular grooves formed on axial end surfaces thereof. The surface of the outer ring 13 had an insulating layer 27 formed thereon with sufficient thicknesses represented by the following L1 to L6. In particular, the thickness L1 of the insulating layer 27 formed on the outer ring annular grooves 37 was thicker than the thickness L6 of the insulating layer 27 formed on the outer ring outer circumferential side end surfaces 31 that were approximately flat in the radial direction, and e en the smallest thickness L3 was a thickness of 240 μm or more.

L1=599.29 μm
L2=256.38 μm
L3=246.73 μm
L4=369.50 μm
L5=479.07 μm
L6=407.72 μm

Figure 14:
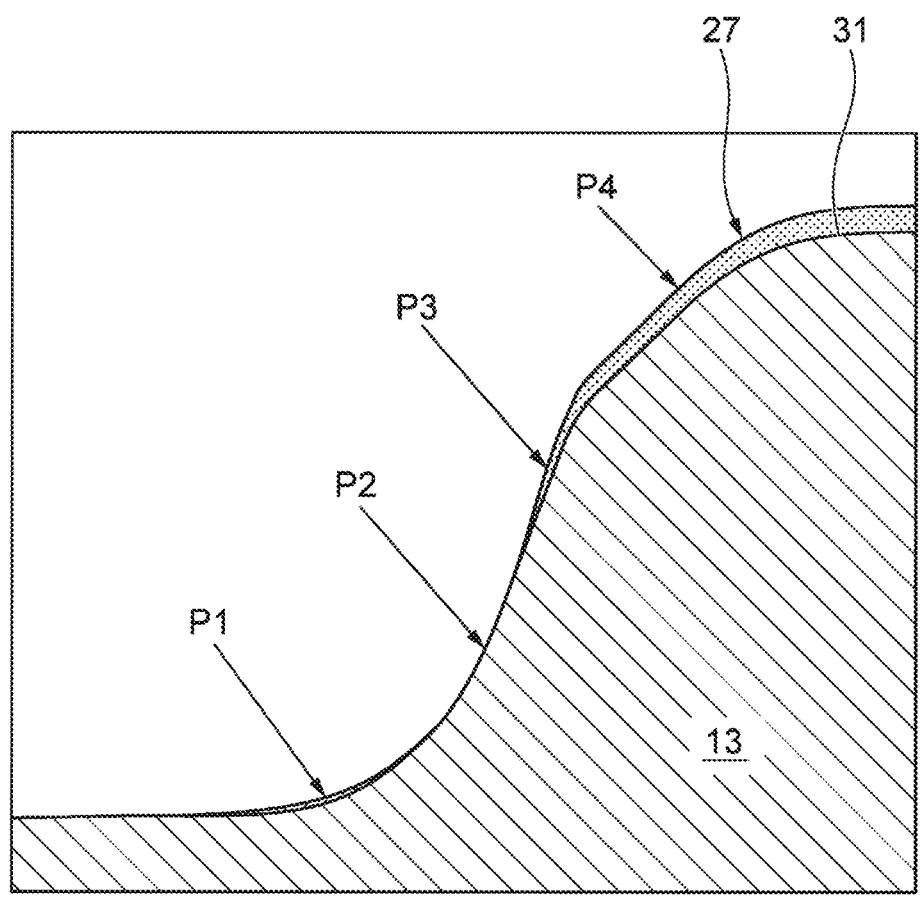
FIG. 14 is a schematic cross-sectional view of a reference example in a state where an insulating layer is welded on an outer ring having end surfaces that are stepped but without outer ring annular grooves formed thereon.

FIG. 14 is a schematic cross-sectional view of a reference example having an insulating layer welded on an outer ring having end surfaces that were stepped but without outer ring annular grooves formed thereon. In this case, the surface of the outer ring 13 was not sufficiently applied with the insulating layer 27. The state of each portion P1 to P4 was as follows. Further, regarding the thickness of the insulating layer 27, the coating thickness on the inner diameter side on the left side in the drawing was thinner as compared with the outer ring outer circumferential side end surfaces 31. The thickness of the insulating layer on both of the end surfaces of the bearing outer ring (approximately a region of P1 to P3) was approximately 5 μm or less, and the thinnest part had merely an extremely thin coating that was close to 0 μm formed thereon.

P1: extremely thin coating
P2: no coating observed
P3: thin coating
P4: coating formed thereon The samples of the outer rings as illustrated in FIG. 13 and FIG. 14 were subjected to a voltage breakage test. The sample of the outer ring as illustrated in FIG. 14 had a result of approximately 70% of the sample of the outer ring as illustrated in FIG. 13, and caused discharge due to creeping discharge, which indicated that the function of the insulating layer thereof was not shown sufficiently.

Next, the test verified that the positions having a thin coating of the insulating layer was more likely to break and had lower insulation performance than the positions having a thick coating.

<Testing Method>

Two bearings having the same shape and size and coated at the same thermal spraying conditions ere prepared.

One of the bearings was cut vertically, and the state where the insulating layer was coated on the bearing was observed, so as to certify the position having the thinnest coating.

The other bearing was put into a housing and was applied with a direct current voltage. Then, the applied voltage was gradually increased until breakage of the coating began. The portion of dielectric breakdown due to breakage of the coating and the voltage value of dielectric breakdown were certified.

<Testing Result>

When the applied voltage increased to DC 1.54 kV, breakage of the other bearing due to discharge from the housing was certified.

The state of the coating at the broken portion was verified by using the one bearing. The result indicated that the broken portion was the portion having the thinnest coating.

On the portions other than the broken portion (positions having a comparatively thick coating), breakage of the coating was not certified even at the applied voltage of DC 1.54 kV.

Figure 15:
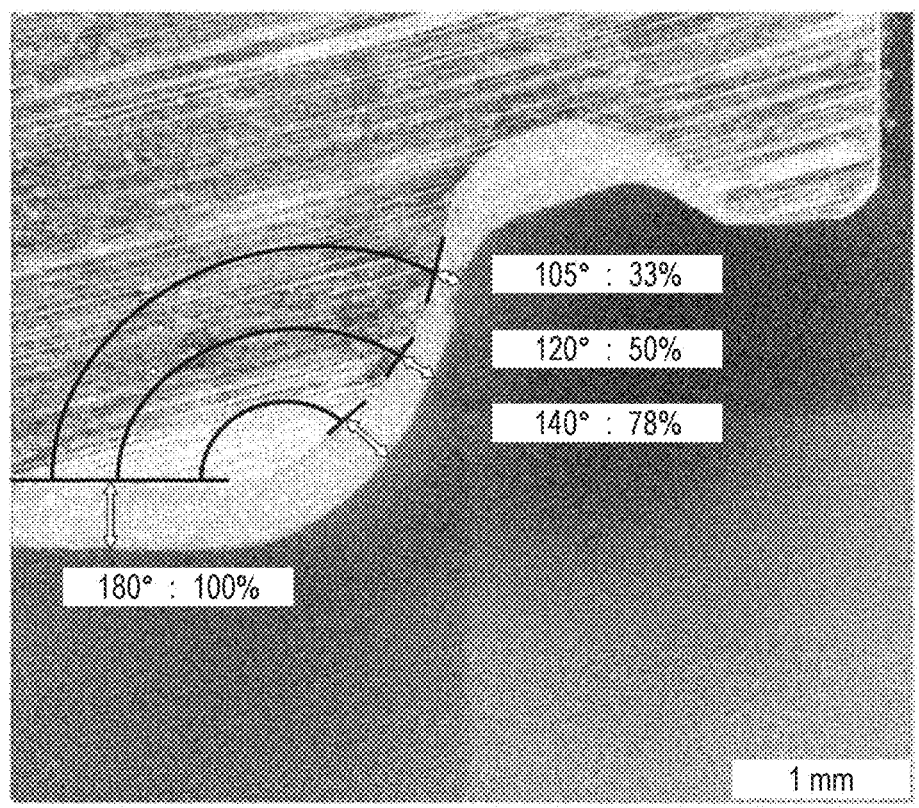
FIG. 15 is a microscope photograph of an enlarged vertical cross section of one bearing used in a test.
Figure 16A:
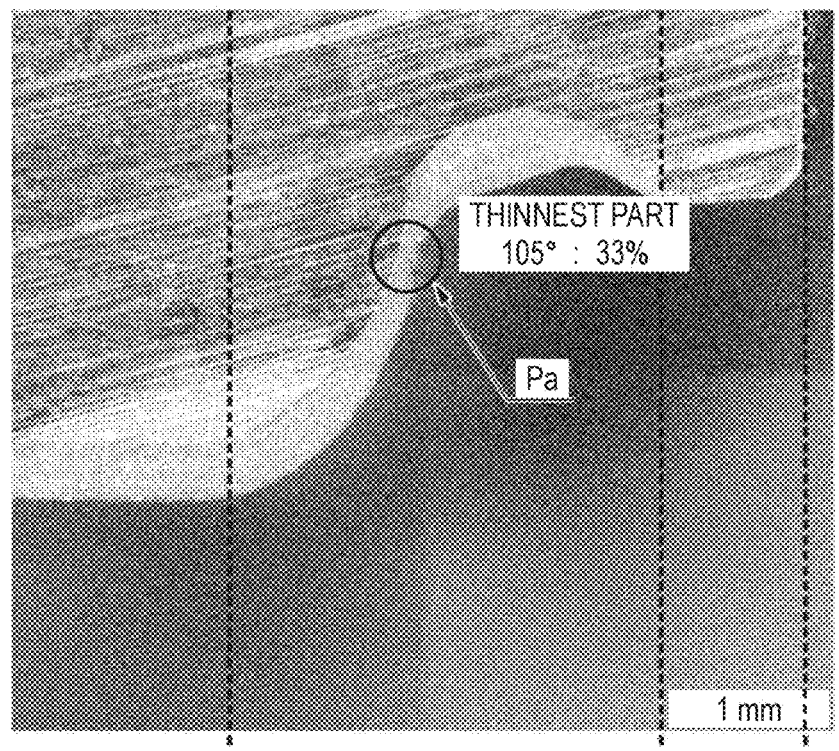
FIG. 16A is a microscope photograph of a position of another bearing used in the test, which corresponds to FIG. 15.

FIG. 15 is a microscope photograph of an enlarged vertical cross section of the one bearing at this time, and FIG. 16A is a microscope photograph of a corresponding position of the other bearing.

FIG. 15 and FIG. 16A illustrate a direction orthogonal to the thermal spraying direction as 180°. As illustrated in FIG. 15, with the coating thickness on the inclined surface of 180° being 100%, the coating thickness of the groove wall surface on the inclined surface of 140° was 78%, the inclined surface of 120° was 50%, and the inclined surface of 105° was 33%.

Figure 16B:
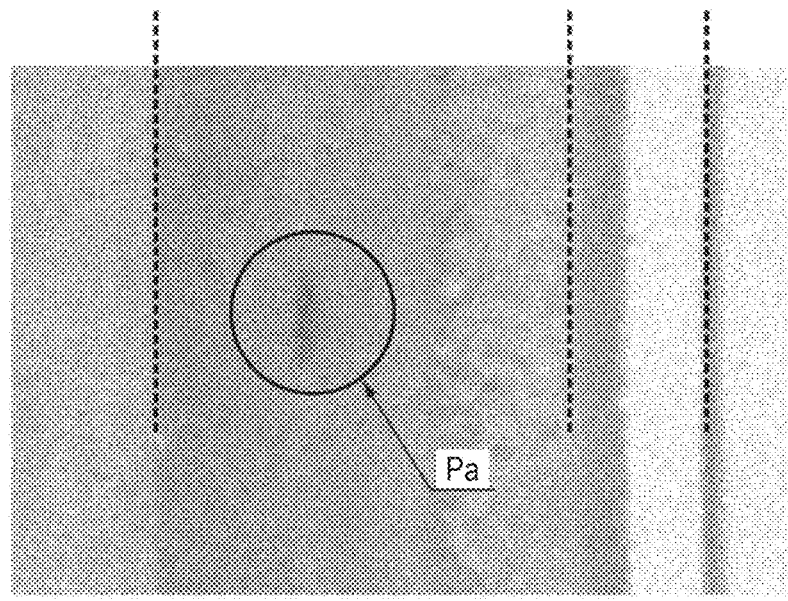
FIG. 16B is a microscope photograph, which is observed from the front side, of a position where dielectric breakdown occurs in FIG. 16A.
Figure 17:
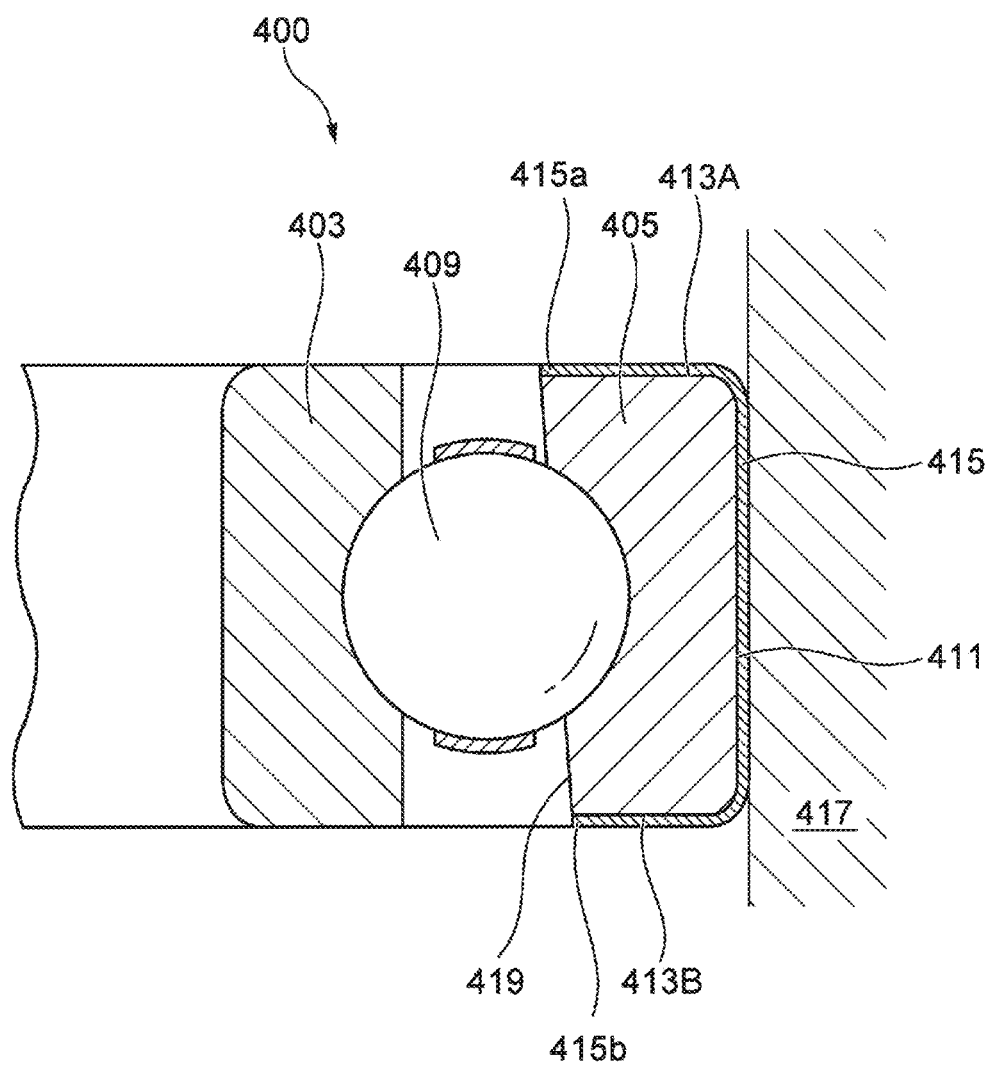
FIG. 17 is a cross-sectional view of a conventional insulated bearing.
Figure 18:
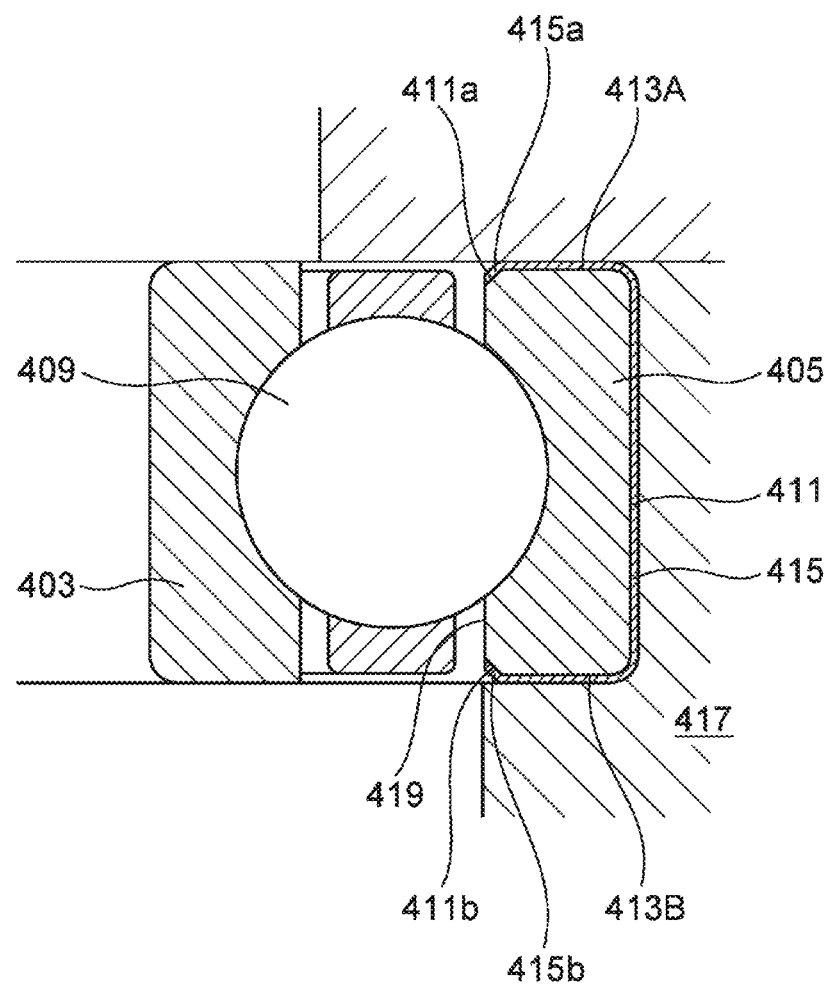
FIG. 18 is a cross-sectional view of a conventional insulated bearing.

As illustrated in FIG. 16A and FIG. 16B, the position Pa with dielectric breakdown occurring was the inclined surface of 105°, which had the thinnest coating thickness.

Therefore, an inclined surface having a small inclination angle (gently inclined surface) has a thicker coating thickness and has better insulation. On the other hand, it was verified that an inclined surface having a large inclination angle (steep inclined surface) has a thinner coating thickness and has lower dielectric breakdown strength.

The present invention is not limited to the above-mentioned embodiment, but modifications and applications made by one skilled in the art based on mutual combination of the configurations of the embodiments, description in the specification, and well-known art, is the plan of the present invention and within the scope of protection.

For example, the insulated bearings having each above configuration, although described as deep groove ball bearings, are not limited thereto, and may be widely applied to various bearings, such as cylindrical roller bearing, tapered roller bearing, and angular ball bearing.

The present application is based on Japanese Patent Application No. 2016-79.592 filed, on Apr. 12, 2016, the contents of which are incorporated herein as reference.

DESCRIPTION OF REFERENCE NUMERALS

11, 41 inner ring (bearing ring)
13, 43 outer ring (bearing ring)
23 outer ring outer circumferential surface (non-raceway surface side circumferential surface)
25A, 25B, 45A, 45B axial end surface
27, 49 insulating layer
29 housing
31 outer ring outer circumferential side end surface (non-raceway surface side end surface)
33 outer ring inner circumferential surface (raceway surface side circumferential surface)
35 outer ring inner circumferential side end surface (raceway surface side end surface)
37 outer ring annular groove (annular groove)
47 inner ring inner circumferential surface (non-raceway surface side circumferential surface)
51 inner ring inner circumferential side end surface (non-raceway surface side end surface)
53 inner ring outer circumferential surface (raceway surface side circumferential surface)
55 inner ring outer circumferential side en surface (raceway surface side end surface)
57 inner ring annular groove (annular groove)
61 outer ring inner circumferential side end surface (raceway surface side end surface)
100, 110, 120, 200, 210, 220, 300 insulated bearing
R1, R2 single arc

The invention claimed is:

1. An insulated bearing, comprising
a pair of bearing rings arranged concentrically to each other and rolling elements arranged to be rotatable between the pair of bearing rings, a bearing ring of the bearing rings having an insulating layer formed thereon, wherein
the bearing ring, having the insulating layer formed thereon, has two annular grooves that are formed on respective end surfaces of the bearing ring, the annular grooves each having an arc-shaped cross section,
at least a surface from a non-raceway surface side circumferential surface to one of the annular grooves of the bearing ring is covered by the insulating layer,
a distance between a groove bottom of each of the two annular grooves of the bearing ring in an axial width direction is less than a distance between raceway surface side end surfaces of the bearing ring in the axial width direction, the raceway surface side end surfaces respectively connected to the two annular grooves and respectively formed as a part of the end surfaces, and
for each of the end surfaces of the bearing ring:
the end surface includes a non-raceway surface side end surface, a respective one of the raceway surface side end surfaces, and the annular groove, formed on the end surface between the non-raceway surface side circumferential surface and the respective one of the raceway surface side end surfaces, and
the annular groove and the non-raceway surface side end surface are connected to each other via an inclined surface, and
the inclined surface includes a thinnest portion of the insulating layer from the non-raceway surface side circumferential surface to the annular groove.

2. The insulated bearing according to claim 1, wherein:
an axial width between the non-raceway surface side end surfaces is larger than an axial width between the raceway surface side end surfaces, and
a thickness of the insulating layer formed on the annular grooves is thicker than a thickness of the insulating layer formed on the non-raceway surface side end surfaces.

3. The insulated bearing according to claim 2, wherein:
for each of the end surfaces of the bearing ring, having the insulating layer formed thereon, a cross-sectional shape of the annular groove, formed on the end surface, and the inclined surface is a composite arc obtained by compounding two single arcs, the single arcs being connected to each other.

4. An insulated bearing, comprising
a pair of bearing rings arranged concentrically to each other and rolling elements arranged to be rotatable between the pair of bearing rings, a bearing ring of the bearing rings having an insulating layer formed thereon, wherein
the bearing ring, having the insulating layer formed thereon by spraying, has two annular grooves that are formed on respective end surfaces of the bearing ring, the annular grooves each having an arc-shaped cross section,
at least a surface from a non-raceway surface side circumferential surface to one of the annular grooves of the bearing ring is covered by the insulating layer,
a distance between a groove bottom of each of the two annular grooves of the bearing ring in an axial width direction is less than a distance between raceway surface side end surfaces of the bearing ring in the axial width direction, the raceway surface side end surfaces respectively connected to the two annular grooves and respectively formed as a part of the end surfaces, and
for each of the end surfaces of the bearing ring:
  the end surface includes a non-raceway surface side end surface, a respective one of the raceway surface side end surfaces, and the annular groove, formed on the end surface between the non-raceway surface side circumferential surface and the respective one of the raceway surface side end surfaces, and
  the annular groove and the non-raceway surface side end surface are connected to each other via only an inclined surface, and
for each of the end surfaces of the bearing ring, having the insulating layer formed thereon, a cross-sectional shape of the annular groove, formed on the end surface, and the inclined surface is a composite arc obtained by compounding two single arcs, the single arcs being connected to each other.

5. The insulated bearing according to claim 4, wherein:
an axial width between the non-raceway surface side end surfaces is larger than an axial width between the raceway surface side end surfaces.

6. The insulated bearing according to claim 4, wherein:
the single arcs of the composite arc have a tangent line in common with each other at a joining point of the single arcs.

7. The insulated bearing according to claim 4, wherein:
the insulating layer is a ceramic thermal sprayed layer.

8. The insulated bearing according to claim 4, wherein:
a second bearing ring of the bearing rings has a second insulating layer formed thereon, wherein
the second bearing ring, having the second insulating layer formed thereon, has two second annular grooves that are formed on respective second end surfaces of the second bearing ring, the second annular grooves each having an arc-shaped cross section,
at least a surface from a non-raceway surface side circumferential surface to one of the second annular grooves of the second bearing ring is covered by the second insulating layer, and
a distance between a groove bottom of each of the two second annular grooves of the bearing ring in the axial width direction is less than a distance between second raceway surface side end surfaces of the bearing ring in the axial width direction, the second raceway surface side end surfaces respectively connected to the two second annular grooves and respectively formed as a part of the second end surfaces.

9. The insulated bearing according to claim 4, wherein:
a distance, in the axial width direction, between the non-raceway surface side end surfaces of the end surfaces of the bearing ring is equal to a distance between the raceway surface side end surfaces of the bearing ring in the axial width direction.

10. The insulated bearing according to claim 4, wherein:
the insulating layer does not cover the raceway surface side end surfaces of the bearing ring.

* * * * *